(12) United States Patent
Gao et al.

(10) Patent No.: US 7,896,670 B1
(45) Date of Patent: Mar. 1, 2011

(54) CARD CONNECTOR

(75) Inventors: Ni Gao, Guang-Dong (CN); Wei-Hong Liao, Guang-Dong (CN); Ming-Chiang Chen, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/772,167

(22) Filed: Apr. 30, 2010

(51) Int. Cl.
*H01R 13/62* (2006.01)

(52) U.S. Cl. .......................................... 439/159; 439/630

(58) Field of Classification Search .................. 439/159, 439/160, 630
See application file for complete search history.

(56) References Cited

U.S. PATENT DOCUMENTS

| | | | | |
|---|---|---|---|---|
| 6,394,827 B2 * | 5/2002 | Nogami | | 439/159 |
| 6,767,232 B1 * | 7/2004 | Tien | | 439/159 |
| 7,736,162 B1 * | 6/2010 | Chiang | | 439/159 |
| 7,775,826 B1 * | 8/2010 | Wang | | 439/489 |
| 7,780,476 B2 * | 8/2010 | Sun et al. | | 439/630 |

\* cited by examiner

*Primary Examiner* — Thanh-Tam T Le
(74) *Attorney, Agent, or Firm* — Cheng-Ju Chiang

(57) ABSTRACT

A card connector includes an insulating housing, a detection terminal, and a shielding shell. The insulating housing defines a card-receiving cavity in a top surface thereof and a channel at a rear portion of a side thereof to communicate with the card-receiving cavity. The detection terminal is mounted to the side of the insulating housing, and has an elastic portion deflected inwardly to enter the card-receiving cavity and a detection portion formed at a free end of the elastic portion. The shielding shell is covered on the insulating housing, and has a flexible strip deflected inwardly to be located at the channel outside the detection terminal. When an electronic card is fully inserted into the card-receiving cavity, the electronic card presses against the detection portion and make the elastic portion deflect outwardly to electrically contact with the flexible strip.

8 Claims, 4 Drawing Sheets

CARD CONNECTOR

BACKGROUND OF THE INVENTION

1. Field of the Invention

The present invention relates to a card connector, and more particularly to a card connector capable of detecting whether an electronic card is fully inserted thereinto.

2. The Related Art

With the development of electronic technology, more and more electronic products, such as digital cameras, personal digital assistants (PDA) and mobile phones etc, are equipped with card connectors for receiving various electronic cards to achieve multiple functions.

Generally speaking, a conventional card connector includes an insulating housing, a plurality of terminals received in the insulating housing and a shielding shell covered on the insulating housing. An electronic card is inserted into the conventional card connector to electrically connect with the terminals for transmitting signals. However, it is difficult to identify whether the electronic card is fully inserted into the conventional card connector or not, because the conventional card connector does not provide any detection mechanism. If the electronic card is not fully inserted into the conventional card connector, the signals transmission between the terminals and the electronic card will be influenced and become unstable. Therefore, it is desirable to provide a card connector having detection function to overcome the problem encountered in the prior art.

SUMMARY OF THE INVENTION

It is an object of the present invention to provide a card connector capable of detecting whether an electronic card is fully inserted thereinto. The card connector for receiving an electronic card includes an insulating housing, a plurality of signal terminals, a detection terminal, and a shielding shell. The insulating housing defines a card-receiving cavity in a top surface thereof for receiving the electronic card. A rear portion of one side of the insulating housing is cut off to form a channel communicating with the card-receiving cavity. A slender fixing slot is defined at the side of the insulating housing and in front of the channel with a rear end thereof communicating with the channel. The signal terminals are received in the insulating housing for electrically connecting with the electronic card. The detection terminal is mounted to the side of the insulating housing, and has a slender fixed portion received in the fixing slot. An elastic portion is extended rearward from a rear end of the fixing portion and deflected inwardly to enter the card-receiving cavity. A free end of the elastic portion is curved inwardly to form a detection portion. The shielding shell is covered on the insulating housing, and has a side plate covered the side of the insulating housing. The side plate defines an opening at a rear portion thereof for corresponding to the channel. A flexible strip is extended rearward from a front edge of the opening and deflected inwardly to be located at the channel and outside the detection terminal. A free end of the flexible strip is curved inwardly to form a contact portion. When the electronic card is fully inserted into the card-receiving cavity, a side of the electronic card presses against the detection portion of the detection terminal and make the elastic portion deflect outwardly to electrically contact with the contact portion of the flexible strip.

As described above, When the electronic card is fully inserted into the card-receiving cavity, a side of the electronic card will press against the detection portion of the detection terminal and make the elastic portion deflect outwardly to electrically contact with the contact portion of the flexible strip. Therefore, the card connector is capable of detecting whether the electronic card is fully inserted or not by the cooperation of the detection terminal and the flexible strip of the shielding shell.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
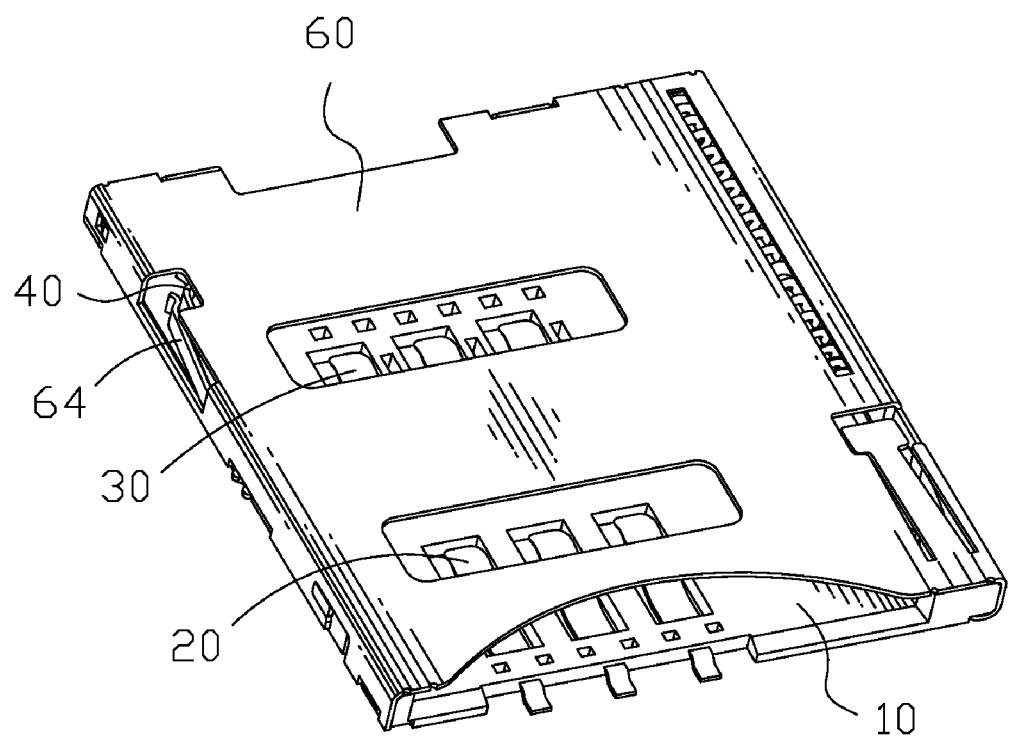
FIG. 1 is a perspective view of a card connector according to the present invention.
Figure 2:
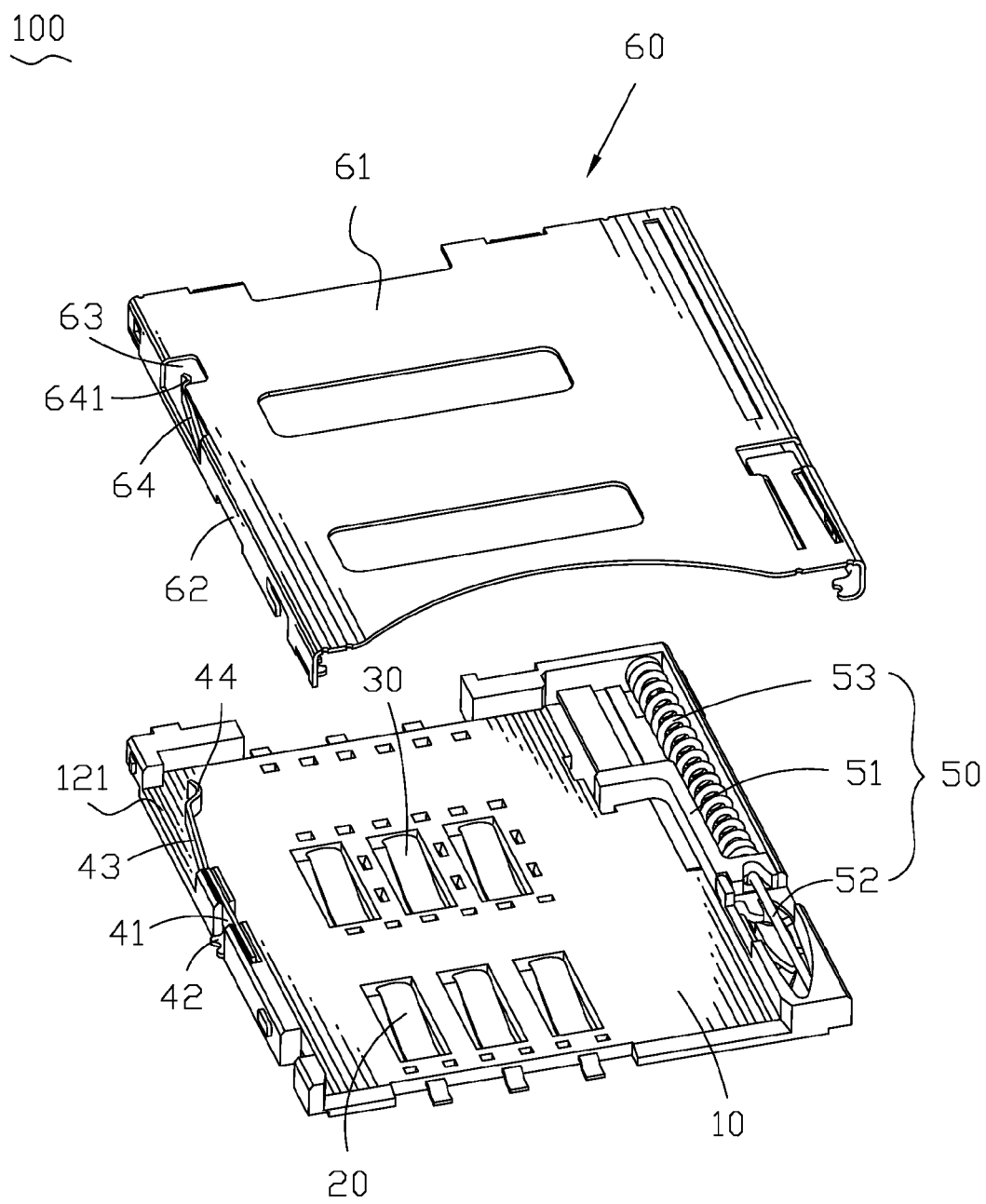
FIG. 2 is a partially exploded view of the card connector shown in FIG. 1.

With reference to FIG. 1 and FIG. 2, a card connector 100 according to the present invention includes an insulating housing 10, a plurality of first signal terminals 20 and second signal terminals 30 received in the insulating housing 10, a detection terminal 40 mounted to one side of the insulating housing 10, an ejector mechanism 50 mounted to the other side of the insulating housing 10 opposite to the detection terminal 40, and a shielding shell 60 covered on the insulating housing 10.

Figure 3:
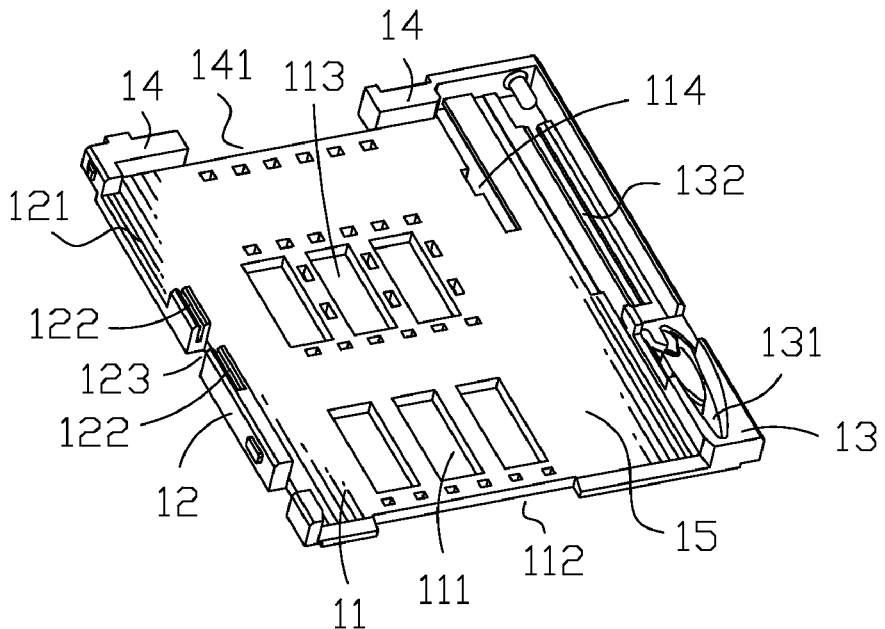
FIG. 3 is a perspective view of an insulating housing of the card connector.

With reference to FIG. 3, the insulating housing 10 has a bottom board 11, a first side wall 12, a second side wall 13 and a rear wall 14 respectively extended upwardly from two opposite sides and a rear side of the bottom board 11 to surround a card-receiving cavity 15 therebetween for receiving an electronic card (not shown). The bottom board 11 defines a plurality of first terminal grooves 111 abreast disposed at a front portion thereof and a plurality of second terminal grooves 113 abreast disposed at a middle portion thereof in alignment with the corresponding first terminal grooves 111. The bottom board 11 defines a first recess 112 transversely arranged at a front side thereof. A substantial middle portion of the rear wall 14 is transversely cut off to form a second recess 141.

A rear portion of the first side wall 12 is cut off to form a channel 121 communicating with the card-receiving cavity 15 and having a bottom surface at the same level with the bottom board 11. A slender fixing slot 122 is defined at the first side wall 12 and in front of the channel 121 with a rear end thereof communicating with the channel 121. A notch 123 is defined at a substantial middle portion of the first side wall 12 to intersect the fixing slot 122 and further make the fixing slot 122 be disconnected. The second side wall 13 defines a heart-shaped groove 131 at a front portion thereof and a receiving groove 132 at a rear portion thereof. The heart-shaped groove 131, the receiving groove 132 together with a sliding groove 114 which is defined at a rear portion of the bottom board 11 are used for receiving the ejector mechanism 50 therein. The ejector mechanism 50 includes a slider 51, a guide pin 52 and a spring 53 which are known to one having ordinary skill in the art and will not describe in detail herein.

Figure 4:
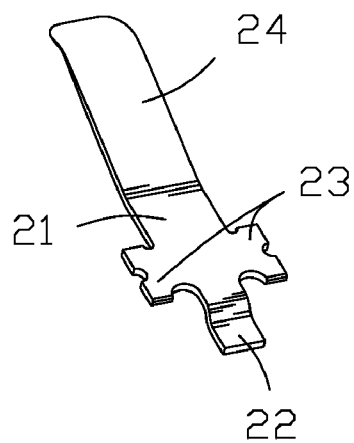
FIG. 4 is a perspective view of a first signal terminal of the card connector.

Referring to FIG. 2, FIG. 3 and FIG. 4, the first signal terminal 20 has a first base plate 21 and two shoulder portions 23 projected sideward from two opposite sides of the first base plate 21. The first base plate 21 and the shoulder portions 23 are all embedded into the bottom board 11 of the insulating housing 10. A first soldered portion 22 is bent forward from a front edge of the first base plate 21 and exposed outside from the bottom board 11 to be located in the first recess 112. A first contacting portion 24 is extended rearward from a rear edge of the first base plate 21 and received in the first terminal groove 111. The first contacting portion 24 further tilts upwardly and projects into the card-receiving cavity 15 for electrically connecting with the electronic card.

Figure 5:
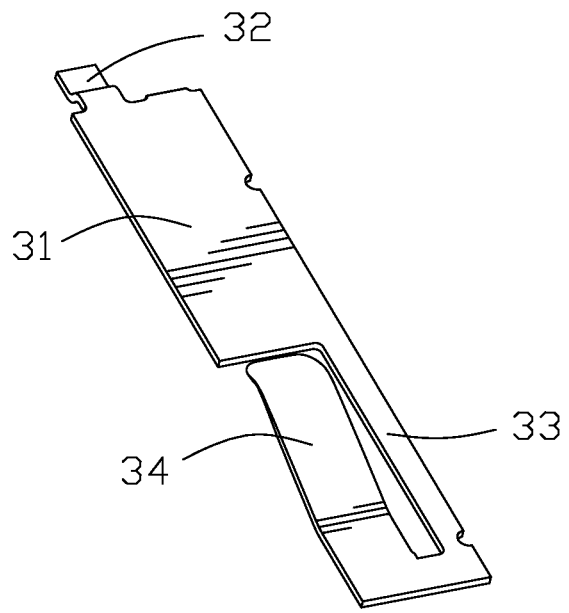
FIG. 5 is a perspective view of a second signal terminal of the card connector.

Referring to FIG. 2, FIG. 3 and FIG. 5, the second signal terminal 30 has a second base plate 31 and a narrow extending strip 33 extended forward from a side of a front edge of the second base plate 31. The second base plate 31 and the extending strip 33 are both embedded into the bottom board 11 of the insulating housing 10. A second soldered portion 32 is bent rearward from a side of a rear edge of the second base plate 31 and exposed outside from the bottom board 11 to be located in the second recess 141. A second contacting portion 34 is extended rearward from a front end of the extending strip 33 and received in the second terminal groove 114. The second contacting portion 34 further tilts upwardly and projects into the card-receiving cavity 15 for electrically connecting with the electronic card.

Figure 6:
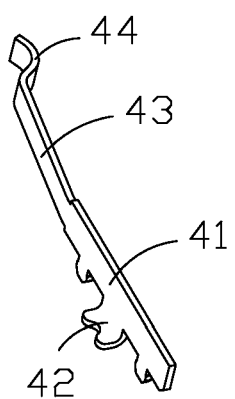
FIG. 6 is a perspective view of a detection terminal of the card connector.

Referring to FIG. 2, FIG. 3 and FIG. 6, the detection terminal 40 is shaped as a strip and extended along an insertion direction of the electronic card. The detection terminal 40 has a slender fixed portion 41 received in the fixing slot 122. A soldered portion 32 is bent outwardly from a substantial middle portion of a bottom edge of the fixed portion 41 and located in the notch 123. An elastic portion 43 is extended rearward from a rear end of the fixing portion 41 and deflected inwardly to enter the card-receiving cavity 15. A free end of the elastic portion 43 is further curved inwardly to form a detection portion 44.

With reference to FIG. 1 and FIG. 2 again, the shielding shell 60 has a cover plate 61 covered on the insulating housing 10 and two side plates 62 respectively extended downwardly from two opposite sides of the cover plate 61 to cover the first side wall 12 and the second side wall 13, correspondingly. An opening 63 is defined at a rear portion of a side plate 62 which covers the first side wall 12 and further extended to the cover plate 61 for corresponding to the channel 121. A flexible strip 64 is extended rearward from a front edge of the opening 63 and deflected inwardly to be located at the channel 121 outside the detection terminal 40. A free end of the flexible strip 64 is further curved inwardly to form a contact portion 641.

During inserting the electronic card into the card connector 100, the electronic card will push the slider 51 to move rearward. At the same time, the spring 53 is compressed to store elastic potential energy, and the guide pin 52 is pulled by the slider 51 to slide rearward along the heart-shaped groove 131. When the guide pin 52 slides at a locked condition, the electronic card is fully inserted into the card-receiving cavity 15. In this case, a side of the electronic card presses against the detection portion 44 of the detection terminal 40 and make the elastic portion 43 deflect outwardly to electrically contact with the contact portion 641 of the flexible strip 64. If want to take back the electronic card, push the electronic card again to relieve the locked condition of the guide pin 52. Then, the slider 51 is moved forward under the resiliency of the spring 53 to eject the electronic card from the card connector 100. In this case, the elastic portion 43 of the detection terminal 40 returns to the original condition without contacting the contact portion 641 of the flexible strip 64.

As described above, When the electronic card is fully inserted into the card-receiving cavity 15, a side of the electronic card will press against the detection portion 44 of the detection terminal 40 and make the elastic portion 43 deflect outwardly to electrically contact with the contact portion 641 of the flexible strip 64. Therefore, the card connector 100 is capable of detecting whether the electronic card is fully inserted or not by the cooperation of the detection terminal 40 and the flexible strip 64 of the shielding shell 60.

What is claimed is:

1. A card connector for receiving an electronic card, comprising:
    an insulating housing defining a card-receiving cavity in a top surface thereof for receiving the electronic card, a rear portion of one side of the insulating housing being cut off to form a channel communicating with the card-receiving cavity, a slender fixing slot being defined at the side of the insulating housing and in front of the channel with a rear end thereof communicating with the channel;
    a plurality of signal terminals received in the insulating housing for electrically connecting with the electronic card;
    a detection terminal mounted to the side of the insulating housing, the detection terminal having a slender fixed portion received in the fixing slot, an elastic portion being extended rearward from a rear end of the fixing portion and deflected inwardly to enter the card-receiving cavity, a free end of the elastic portion being curved inwardly to form a detection portion; and
    a shielding shell covered on the insulating housing, the shielding shell having a side plate covered to the side of the insulating housing, the side plate defining an opening at a rear portion thereof for corresponding to the channel, a flexible strip being extended rearward from a front edge of the opening and deflected inwardly to be located at the channel and outside the detection terminal, a free end of the flexible strip being curved inwardly to form a contact portion;
    wherein when the electronic card is fully inserted into the card-receiving cavity, a side of the electronic card presses against the detection portion of the detection terminal and make the elastic portion deflect outwardly to electrically contact with the contact portion of the flexible strip of the shielding shell.

2. The card connector as claimed in claim 1, wherein the side of the insulating housing defines a notch at a substantial middle portion thereof to intersect the fixing slot and make the fixing slot be disconnected, the fixing portion of the detection terminal has a soldered portion bent outwardly from a substantial middle portion of a bottom edge thereof to be located in the notch.

3. The card connector as claimed in claim 1, wherein the insulating housing has a bottom board, a first side wall, a second side wall and a rear wall respectively extended upwardly from two opposite sides and a rear side of the bottom board to surround the card-receiving cavity therebetween, the channel and the fixing slot are defined at the first side wall, and the detection terminal is mounted to the first side wall.

4. The card connector as claimed in claim 3, wherein the shielding shell has a cover plate and two side plates bent downwardly from two opposite sides of the cover plate to correspondingly cover the first side wall and the second side wall, the opening and the flexible strip are arranged at the side plate which covers the first side wall.

5. The card connector as claimed in claim 3, wherein the bottom board of the insulating housing defines a plurality of a first terminal grooves abreast disposed at a front portion thereof and a plurality of second terminal grooves abreast disposed at a middle portion thereof in alignment with the first terminal grooves, the signal terminals includes a plurality of first signal terminals received in the first terminal grooves and a plurality of second signal terminals received in the second terminal grooves.

6. The card connector as claimed in claim 5, wherein the bottom board defines a first recess transversely arranged at a front side thereof, the first signal terminal has a first base plate embedded into the bottom board, a first soldered portion is bent forward from a front edge of the first base plate and located in the first recess, a first contacting portion is extended rearward from a rear edge of the first base plate and received in the first terminal groove.

7. The card connector as claimed in claim 6, wherein a substantial middle portion of the rear wall is transversely cut off to form a second recess, the second signal terminal has a second base plate and a narrow extending strip extended forward from a front edge of the second base plate both embedded into the bottom board, a second soldered portion is bent rearward from a rear edge of the second base plate and located in the second recess, a second contacting portion is extended rearward from a front end of the extending strip and received in the second terminal groove.

8. The card connector as claimed in claim 3, further comprises an ejector mechanism mounted to the second side wall of the insulating housing opposite to the detection terminal.

* * * * *